United States Patent
Dossaji et al.

[11] Patent Number: 5,961,698
[45] Date of Patent: Oct. 5, 1999

[54] TWIN TOWER AIR DRYER

[75] Inventors: Murtaza R. Dossaji, Spartanburg; Larry L. Foster, Greer; Conley L. McGee, Simpsonville; Charlie E. Jones, Greenville; Glenn A. Thomas, Greer; Michael V. Kazakis, Simpsonville, all of S.C.

[73] Assignee: Westinghouse Air Brake Company, Wilmerding, Pa.

[21] Appl. No.: 09/017,245

[22] Filed: Feb. 2, 1998

[51] Int. Cl.⁶ ................................................ B01D 53/04
[52] U.S. Cl. ............................... 96/130; 96/115; 96/133; 96/134; 96/138; 96/144; 96/147; 96/151; 55/DIG. 17; 34/80
[58] Field of Search ............................ 96/134, 138, 130, 96/121, 133, 144, 147, 151, 113, 114, 115, 116; 55/DIG. 17; 34/80; 210/DIG. 17

[56] References Cited

U.S. PATENT DOCUMENTS

| | | | |
|---|---|---|---|
| 2,894,630 | 7/1959 | Humbert, Jr. | 210/DIG. 17 |
| 3,258,899 | 7/1966 | Coffin | 96/114 |
| 3,323,292 | 6/1967 | Brown | 96/130 |
| 5,604,991 | 2/1997 | Castle et al. | 34/80 |
| 5,607,500 | 3/1997 | Shamine et al. | 96/147 |

*Primary Examiner*—Jay H. Woo
*Assistant Examiner*—Robert A. Hopkins
*Attorney, Agent, or Firm*—James Ray & Associates

[57] ABSTRACT

A twin tower gas drying system for cleaning and drying a stream of unpurified pressurized gas received from a source thereof for use of a pneumatic system. The drying system includes a manifold block provided with the plurality of ports. A separator and sump is connected to such block and to one of the ports for initially separating moisture and particulates from such stream of unpurified gas, and for directing the remainder of the stream to the one port in the block. A pair of desiccant containing canisters are threadably mounted on a surface of the block opposite that of the separator and sump by two respective threaded shuttle valves. The canisters and shuttle valves are, in addition, connected in fluid communication with certain of the ports provided in the block for supplying and removing pressurized air from the canisters. A port is provided for discharging dry clean air from the block. Other ports provided in the block exhaust purged air to the atmosphere. And, two ports are provided in the sump for respectively releasing liquid collected in the sump and for admitting pressurize air from a compressor.

4 Claims, 2 Drawing Sheets

TWIN TOWER AIR DRYER

CROSS-REFERENCE TO RELATED APPLICATIONS

The invention taught in this patent application is closely related to the inventions taught in U.S. Pat. Nos. 5,423,129, 5,604,991, 5,662,728 and 5,685,896 and is further closely related to the following pending patent applications: "E-1 Twin Tower Air Dryer for an Air Compressor", U.S. Ser. No. 08/976,649 filed Nov. 26, 1997 pending; "E-1 Air Dryer Liquid Separator With Baffle", Ser. No. 08/978,796 filed Nov. 26, 1997 pending; "Control Valve With Axial Sealing", Ser. No. 08/978,551 filed Nov. 26, 1997 pending "Shuttle Valve Mechanism For Twin Tower Air Dryer", Ser. No. 08/979,198 filed Nov. 26, 1997 pending, "Purge Tube With Flapper Valve For Desiccant Containing Air Dryer", Ser. No. 08/979,197 filed Nov. 26, 1997 pending and "Shuttle Valve for Twin Tower Air Dryer", Ser. No. 09/017,126 filed Feb. 2, 1998 and "Low Profile Discharge Check Valve", Ser. No. 09/017,247 filed Feb. 2, 1998 both being filed concurrently herewith. All of tie above-referenced patents and patent applications are assigned to the assignee of this invention. Additionally, the teachings of each of those issued patents and pending patient applications is incorporated herein by reference thereto.

FIELD OF THE INVENTION

The present invention generally relates to twin tower air cleaning and drying systems for air compressors. More particularly, the present invention pertains to a new and improved twin canister air cleaning and drying system for such air compressors.

BACKGROUND OF THE INVENTION

It will be appreciated that Westinghouse Air Brake Company air dryers are designed to remove moisture from compressed air for use in compressed air systems as utilized on railway trains, transit vehicles and the like, as necessary to operate the air brake system and air valves. U. S. Pat. No. 5,423,129, assigned to the assignee of this invention and cited above, discloses such a system wherein the compressed air is cleaned and dried by passing it through a regenerating system containing a desiccant material to absorb the moisture and filter-out particulate matter. The desiccant is regenerated by passing a small percentage of the dried air back therethrough which absorbs at least some of the moisture collected in the desiccant and is therefore discarded.

In operation, the above rioted prior art air drying system (now referred to as the "single tower" system) receives compressed air from a conventional air compressor, a supply which typically contains an unacceptably high amount of moisture and other particulates suspended therein. This unpurified compressed air is caused to flow upwardly through a desiccant material usually in the form of a porous cartridge containing a porous desiccant media. The desiccant plays the key role within the single tower air drying system in that it absorbs the moisture and traps various particulates (e.g., dust, dirt, etc.) as the compressed air moves upwardly through the desiccant media. Once moisture and particulates are extracted from the air stream, the cleaned and dried compressed air continues flowing from the desiccant media through a purge check valve situated near the top of the tower. This purified compressed air then passes through a side chamber, a part of which eventually reaches a purge volume.

When the air compressor is cycled off, the system operates in a purge mode. During the purge mode, the purified pressurized air contained within the purge volume passes slowly in the reverse direction through a choke in a purge check valve and then back through the desiccant media. This slow stream of dried air reabsorbs a portion of the moisture previously collected within the desiccant media. Having evaporated into this passing stream of dry air, the evaporated moisture eventually exhausts through the sump volume to atmosphere. This gradual purging of dry air back through the system serves to dry out and thus rejuvenate or regenerate the desiccant media. When the air compressor is again cycled on, the tower system returns to operation in a drying mode, with the desiccant media then again removing moisture from the stream of unpurified compressed air passing therethrough.

More recently, a twin tower system has been proposed and developed in which a pair of desiccant containing chambers or towers are provided, each alternating back and forth between operation in drying mode and in recycle mode. Accordingly, at any given moment of operation, one tower is operating in air drying cycle while the other is operating in recycle mode or purge cycle. A pair of control valves are provided to automatically switch the flow to reverse these flow directions so that after a defined time period the cycles are reversed so that in effect a continuous operation is achieved with each tower alternately operating in a drying mode thereby permitting moisture to collect within the desiccant media while the other tower is in recycle mode removing the collected moisture from the desiccant material or media. This unique system obviously has a greater moisture removing capability and also avoids the need to have the source of unpurified air cycled-off in order to purge the desiccant material of the moisture it has accumulated, and thereby eliminate the need to temporarily deprive the pneumatic system of a steady supply of clean and dried compressed air while the compressor is turned off.

In addition to the above advantages, the switching of the two drying assemblies alternately between the drying and the purging modes allows the twin tower system to exsiccate the air stream more efficiently than the prior art single tower system. Two desiccant towers rather than one are employed in the air drying system with one absorbing moisture while the other is being purged of it. The switching of the two drying assemblies alternately between the drying and the purging modes thus serves to continuously purge moisture from the twin tower system. More fully desiccated air is thus supplied to the pneumatic system. The amount, density and overall surface area of the desiccant can also be selected to suit varying needs.

The twin tower system can be applied to a wide variety of pneumatic systems. Typical of the types of pneumatic systems to which the twin tower system could be applied include the pneumatic brake systems of passenger and freight railroad trains, subway trains and various other types of rail related transportation systems. Further examples include the pneumatic brake systems of various truck transport vehicles. Other types of pneumatic systems to which the twin tower system could be applied may be found outside the transportation field.

Another disadvantage of the single tower air drying system is that it is only capable of removing a certain, limited amount of moisture during the purge mode. Because the volume of unpurified air flowing into the system to be dried vastly exceeds the volume of purified air used to purge the desiccant media, the desiccant media never adequately exsiccates during operation of the single tower system.

Indeed, the desiccant media adequately exsiccates only after the system has been turned off for a prolonged time sufficient to accomplish same.

While prior art twin tower systems have served well, there is still the need for improvements in compactness, serviceability and adaptability in using twin tower dryers with a variety of compressors.

SUMMARY AND OBJECTS OF THE INVENTION

A primary objective of the invention is to provide air delivery from a compressor to a main reservoir via a compact, easily serviceable air dryer while also providing a method of purging and regenerating desiccant material in twin tower desiccant canisters of the air dryer. Serviceability is effected by the use of disposable, readily removable and connectable, low clearance air drying canisters using shuttle valves threadably connectable to and between the canisters and a shallow manifold block which pneumatically connects the block and canisters together, connects two such canisters together, and connects the two canisters to an air compressor and to a system using air dried and cleaned by the canisters.

Adaptability is provided in the present invention by use of a standard size threaded opening provided in the subject dryer. The vast majority of air compressors can be connected to the dryer using a simple flexible hose with a standard fitting for threading into the opening. Heretofore, prior dryers required a special kit to interface them with compressors.

THE DRAWINGS

The invention, along with its advantages and objectives, will be better understood from consideration of the following detailed description and the accompanying drawings, in which.

PREFERRED EMBODIMENT OF THE INVENTION

Figure 1:
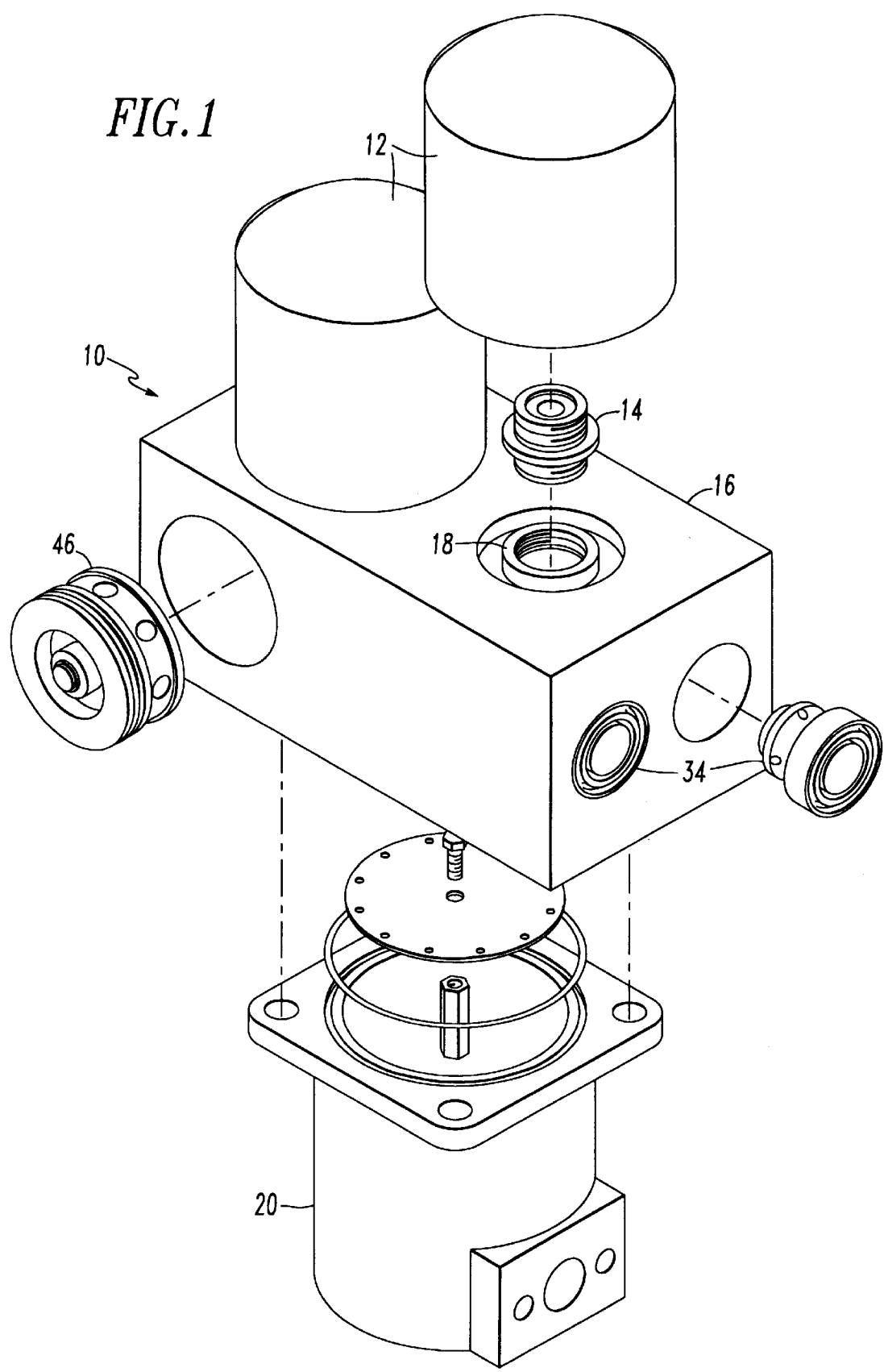
FIG. 1 is an exploded view of the dryer system of the invention.

Referring now to FIG. 1 of the drawings, an exploded view of the dryer system of the invention is shown and identified generally by numeral 10. The system includes two, disposable threaded canisters 12, two, externally threaded, shallow shuttle/purge valves 14 for threading into canisters 12 and thereby pneumatically connecting canisters 12 to a manifold block 16 having threaded openings 18 for receiving the threaded valves 14. Thus, canisters 12 are readily removable from and attachable to block 16, via threaded valves 14, and threaded valves 14 are readily removable from and attachable to the canisters 12 and block 16.

The valves 14, being shallow or short provide about a one inch clearance for removing and installing the canisters 12, whereas prior dryers use desiccant bags that require seven inches of removal and installation clearance.

Further, removal and installation of the canisters 12, in the present invention, involves simple spinning motions of the canisters 12, as threaded onto and from valves 14.

Figure 2:
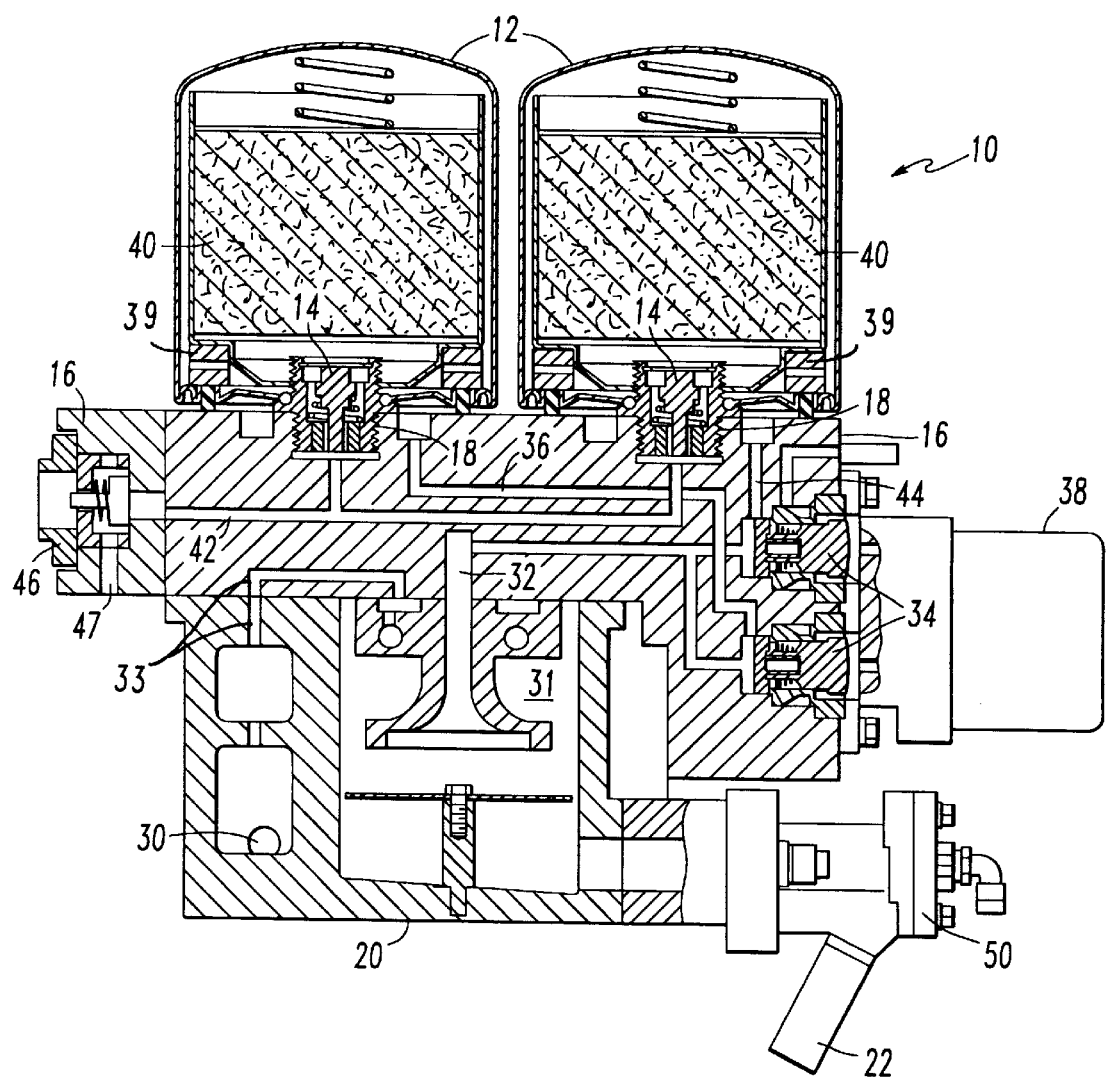
FIG. 2 is a sectional view of the dryer system of FIG. 1.

The compactness of dryer system 10 is best seen in FIG. 2, with canisters 12 fully attached to one side or face of block 16, and a sump housing 20 suitably attached to the side and surface of the block 16 opposite the canisters 12. The block 16 itself is relatively shallow, i.e., on the order of 3.9 inches thick and 5½ inches wide. The overall height of the dryer, measuring from a lower funnel 22 at the bottom of sump 20 to the top of cartridges 12 is about eighteen inches.

As seen in FIG. 2, block 16 is provided with a number of ports connecting the various components of twin tower drying system 10. Air flow from a compressor (not shown) enters an inlet port 30 provided in sump 20 and is directed to a centrifugal separator, 31 via a channels 33 provided in block 16 and sump housing 20, causing heavy water and impurities to impact the sidewall of the separator and fall to the sump bottom. The air and any remaining moisture contained in the air enters into block 16 via a port 32 provided in the block 16, which port 32 directs the air and moisture to two control (spool) valves 34. The control valves 34 alternately direct such air and moisture to the respective canisters 12 via ports 36 in block 16, only one of which is visible in FIG 2. The control valves 34 are operated by two solenoid valve 38 which, in turn, are energized by a timer (not shown). Thus, the direction of "purge" and "dry" airflow in block 16 is directly controlled by the spool valves 34. In the dry flow and process, moist air is directed along port 36 to and through a coalescer element 39 located in a lower portion of each canister 12 which removes oil and other fine impurities from the moist air. From such element 39, which is a sponge-like material, air flows to the upper portion of canister 12 and down through a desiccant material 40 in canister 12 to shuttle valve 14 and to a port 42 that is common with the two canisters 12 and shuttle valves 14.

While the drying process is occurring in one of the canisters 12, the other canister is purging its desiccant of moisture with a small flow of dry air directed from the drying canister via common port 42 to the shuttle valve 14 of the purging canister. The shuttle valve 14 directs this small flow upwardly (in the figures) through desiccant 40 to remove moisture therefrom for exhaust to atmosphere via ports 44 (only one of which is visible in FIG. 2) connecting the canister to the spool valves 34.

The dry air from the drying canister leaves block 16 via port 42 and a discharge valve 46. From the discharge valve 46, dry air is sent to a reservoir (not shown), for example, while a small percentage of the dry air is sent via a port 47 in block 16 to the solenoid valves 38 and to the control timer (not shown).

Thus, block 16 provides a compact structure for handling pressurized air and directing the same to components mounted on the block 16 for removing water and other impurities from the air, and then directing relative dry air and purge air from the block 16. The material of the block 16 is preferably an aluminum alloy, such as 6061, which is easily machinable to provide appropriate tolerances. Another advantage of the present invention is its adaptability to a variety air compressors and aftercoolers if used. This involves the provision of a standard size threaded opening 30, in the wall of sump housing 20, as seen in FIG. 2 of the drawings. This opening will receive standard size threaded fittings provided at the ends of the flexible hoses so that substantially all compressors requiring air dryers can be directly connected to the air drying system 10 of the subject invention. The current standard size for fittings for handling compressor output in the industry is a ¾ inch outer fitting diameter that provides a generally ½ inch inner diameter for conducting air flow. No adapting kits or other components are needed to connect dryer assembly 10 to the vast majority of air compressors utilizing dryer systems.

Liquid water collects in sump 20 and is expelled to atmosphere via a drain valve 50 and funnel 22.

The air dryer assembly and system 10 of the present invention provides compactness and quick serviceability in allowing spin removal and replacement of dryer canisters 12 in a one inch clearance space, and adaptability that allows easy, quick connection of most compressors to the dryer sump 20 of system 10 via a standard size threaded opening 30 in the wall of the sump.

While a presently preferred embodiment for carrying out the instant invention has been set forth in detail, those persons skilled in the air drying and cleaning art to which this invention pertains will recognize various alternative ways of practicing the invention without departing from the spirit and scope of the claims appended hereto.

What is claimed is:

1. A twin tower gas drying system for cleaning and drying a stream of unpurified pressurized gas received from a source thereof for use by a pneumatic system, said gas drying system comprising:

a relatively shallow manifold block provided with a plurality of passageway and ports, a separator and sump connected to said block and to one of said plurality of ports for initially separating moisture and other particulates from such stream of unpurified gas before directing the remainder of the stream to the one port of said plurality of ports provided in said block, a pair of removable, relatively shallow and circular shuttle valves threadably mounted into openings provided in an external surface of said block and located opposite that of the separator and sump a pair of desiccant containing canisters for threading respectively to said pair of shuttle valves, said canisters and shuttle valves being, in addition, connected in fluid communication with certain of the ports and passageways of said plurality provided in the block to supply and remove pressurized air from the canisters, said ports including further:

at least one port for discharging dry, clean air from said block, at least one port for exhausting purged air to the atmosphere from said block, and a port provided in said sump for releasing to atmosphere particles and liquid collected in the sump.

2. The twin tower gas drying system of claim I wherein a threaded port is provided in a wall of the sump for directly receiving a standard size threaded fitting on one end of a hose for connecting the sump to a source of pressurized air.

3. The twin tower gas drying system of claim 1 wherein the manifold block is made of machineable material.

4. The twin tower gas drying system of claim 3 wherein the material of the manifold block is an aluminum alloy.

\* \* \* \* \*